United States Patent
Wilson

[11] Patent Number: 5,694,778
[45] Date of Patent: Dec. 9, 1997

[54] REFRIGERANT METERING CHARGE BOARD AND METHOD OF ITS OPERATION

[75] Inventor: Stephen W. Wilson, Fort Smith, Ark.

[73] Assignee: Whirlpool Corporation, Benton Harbor, Mich.

[21] Appl. No.: 505,549

[22] Filed: Jul. 21, 1995

[51] Int. Cl.$^6$ .................................................. F25B 45/00
[52] U.S. Cl. .................................................. 62/77; 67/149
[58] Field of Search .................... 62/149, 292, 77, 62/126, 298

[56] References Cited

U.S. PATENT DOCUMENTS

| | | | |
|---|---|---|---|
| 3,791,165 | 2/1974 | Honnold, Jr. et al. | 62/149 |
| 5,317,903 | 6/1994 | McClelland et al. | 62/149 |

*Primary Examiner*—John M. Sollecito
*Attorney, Agent, or Firm*—Thomas J. Roth; Mark A. Davis; Joel M. Van Winkle

[57] ABSTRACT

A refrigerant metering charge board that accurately meters a refrigerant and an associated synthetic compressor oil into a product, preferably a refrigerator, is provided. Metering is accomplished by way of servo motors coupled to ball screws which are in turn connected to hydraulic cylinders. Calibration of the refrigerant, preferably R134a, is maintained using a temperature sensor, a programmable logic controller (PLC) and a density/temperature equation that has been empirically fit to saturation data. The preferred equation is a modified Benedict-Webb-Ruben (MBWR) equation of state. The refrigerant charge amounts are entered into the PLC using either a fixed bar code scanner or a hand-held bar code scanner that reads a bar code on the refrigerator. An operator interface, preferably a touch-screen display is also provided. A charging tool to connect to the product for inserting the refrigerant is located in a chargeable automatic connect/disconnect mechanism (ACDM) which allows for automatic operation on a assembly line.

7 Claims, 13 Drawing Sheets

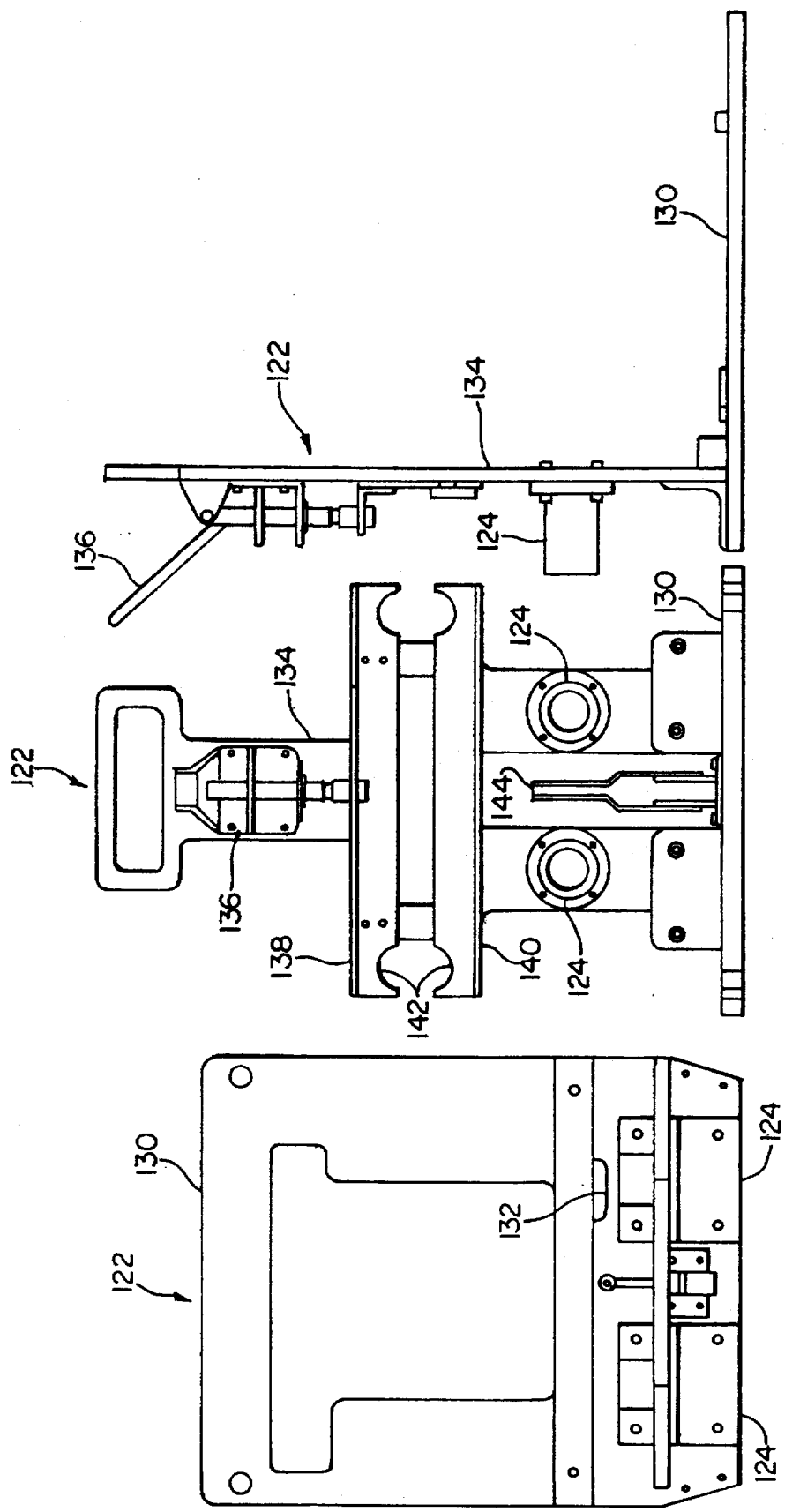

REFRIGERANT METERING CHARGE BOARD AND METHOD OF ITS OPERATION

BACKGROUND OF THE INVENTION

The present invention relates generally to charging refrigerators with refrigerant during manufacture of the refrigerator and more specifically to a refrigerant metering charge board for supplying a precise mount of refrigerant to a specific refrigerator in an automated manner.

A household refrigerator operates by using the refrigerant to cool the inner volume of the refrigerator thereby keeping the contents stored therein cool. As a result, during the manufacturing of a refrigerator, the refrigerant must be inserted into the refrigerator. In known systems, the amount of refrigerant to be metered into the refrigerator has been based on the temperature of the refrigerant.

Also, known charging units having hydraulics with valves to change the flow direction have been used in the charging process of the refrigerator. However, the hydraulic fluid present would often contaminate the refrigerant. The resulting contamination would disable the unit and render the refrigerator inoperable or at least less efficient with present refrigerants, i.e. R134a.

With the known charging units, an attempt to charge an already charged refrigerator could cause a major mishap on the assembly line. Such a mishap would disrupt production and decrease product output. Also, the accuracy of known charge units for introducing the proper amount of refrigerant is unsatisfactory and results in inefficiencies.

In known systems, the refrigerant is manually inserted in the refrigerator by using a charge gun that has been connected by hand. The type of repetitive activity involved in making the connections often cause the worker performing the task to develop carpal tunnel syndrome or other types of repetitive operation injury. It is also quite dangerous to use certain known devices to charge the refrigerator, and many injuries have resulted from using the same.

As a result, a need has arisen for a refrigerant metering charge board that provides a precise amount of refrigerant under pressure to a refrigerator using servo motor-controlled hydraulic systems with an automated connect and disconnect mechanism to charge a refrigerator.

SUMMARY OF THE INVENTION

Accordingly, the present invention provides a refrigerant metering charge board that provides a precise amount of refrigerant under pressure to a refrigerator using servo motor-controlled hydraulic systems with an automated connect and disconnect mechanism for charging the refrigerator.

The objects of the present invention are inventively achieved in a system for metering oil and refrigerant through filling ports into refrigerant tubing in a series of refrigerating appliances during manufacture. The system comprises: a conveyor system for carrying the appliances toward a charging station; a charging unit positioned at the charging station and being supplied with refrigerant and oil to be dispensed from dispensing ports thereon; automatic means for stopping an individual appliance at the charging station; automatic means for aligning the filling ports on the appliance with the dispensing ports on the charging unit; means for determining and dispensing a proper charge of refrigerant and oil from the dispensing ports on the charging unit and into the filling ports on the appliance; and a conveyor system for moving the appliances away from the charging station after the dispensing has occurred.

In an embodiment, the automatic means for stopping an individual appliance has a position sensor connected to a control for the conveyor to cause the conveyor to stop upon the detection of the presence of an appliance.

In an embodiment, the automatic means for aligning the filling ports and dispensing ports comprises an automatic connect/disconnect unit (ACDM) carrying the dispensing ports and being mounted on a frame movable about three perpendicular degrees of movement, and alignment devices associated with the appliance and the ACDM which interact to align the filling ports and the dispensing ports.

In an embodiment, the system further comprises recognition means for identifying the appliance connected to the means for determining and dispensing the proper charge of refrigerant and oil.

In an embodiment, the recognition means for identifying the appliance is a bar code scanner.

In another embodiment of the present invention, a system for determining a proper charge of refrigerant to charge a refrigerating appliance is provided. The system comprises: a temperature sensor connected to a supply of refrigerant and oil, the sensor providing an output temperature signal; a pressure sensor connected to a supply of refrigerant and oil, the sensor providing an output pressure signal; and a means for processing the temperature signal and the pressure signal to calculate a charge amount of refrigerant dependent on the temperature signal and the pressure signal.

In an embodiment, the means for processing further comprises a programmable logic controller (PLC) connected to the temperature sensor and the pressure sensor, the PLC being capable of using a modified BWR equation of state to calculate an output charge amount of refrigerant and oil wherein the temperature signal and the pressure signal are input parameters in the modified BWR equation.

In a further embodiment of the present invention, a method of determining a proper charge amount of refrigerant to charge a refrigerating appliance is provided. The method comprises the steps of: measuring a temperature of the refrigerant and providing a temperature signal; measuring a pressure of the refrigerant and providing a pressure signal; and processing the temperature signal and the pressure signal to calculate a proper charge amount of refrigerant to charge the refrigerating appliance.

In an embodiment, the method further comprises the step of calculating a proper charge amount of refrigerant by using the temperature signal and the pressure signal as input parameters in a modified BWR equation of state.

In an embodiment, the processing step includes calibrating the refrigerant to provide a calibration factor; and multiplying the calibration factor by the modified BWR equation of state to determine a proper charge amount of refrigerant.

In an embodiment, the method further comprises the step of performing a planar regression on the modified BWR equation.

The present invention provides, in an embodiment, a system for dispensing a metered charge of refrigerant and oil from a supply of refrigerant and a supply of oil into a refrigerating appliance. The system comprises: a hydraulic cylinder having a shaft; and a servo motor connected to the hydraulic cylinder via a ball screw and ball screw nut, the servo motor being constructed and arranged to drive the ball screw such that the ball screw nut advances the shaft of the hydraulic cylinder thereby metering a charge of refrigerant and oil.

In an embodiment, the system includes a programmable logic controller (PLC) connected to the servo motor to provide a run signal having a calculated duration for operating the servo motor.

In an embodiment, the system also has a guide rail to guide the shaft of the hydraulic cylinder.

In an embodiment, the system includes an ester oil cylinder connected to the hydraulic cylinder to aid in metering the refrigerant.

In an embodiment, the hydraulic cylinder is connected to the supply of oil and a further hydraulic cylinder is connected to a supply of refrigerant. The further hydraulic cylinder is also connected to an ester oil cylinder.

In an embodiment of the present invention, a method of dispensing a metered charge of refrigerant and oil from a supply of refrigerant and a supply of oil into a refrigerating appliance is provided. The method has the steps of: connecting a hydraulic cylinder having a shaft to a servo motor via a ball screw and a ball screw nut; driving the ball screw with the servo motor to advance the ball screw nut, thereby advancing the shaft of the hydraulic cylinder to meter out a proper amount of refrigerant and oil.

In an embodiment, the method includes the step of providing a PLC to calculate a run signal having a calculated duration for operating the servo motor.

In an embodiment, the method also has the step of using a modified BWR equation to calculate the drive signal for operating the servo motor such that the drive signal is proportional to the metered charge of refrigerant and oil.

In an embodiment, a refrigerant metering charge board apparatus, comprising: a mounting enclosure; a refrigerant and oil dispensing system substantially contained within the mounting enclosure; a user interface located in the mounting enclosure; an automatic connect/disconnect mechanism (ACDM) respectively connected to the refrigerant and oil dispensing system and the user interface; a charge gun connected to the ACDM; and means for positioning a refrigerating appliance to be charged by the charge gun such that the refrigerating appliance is appropriately positioned relative to the ACDM for proper metering operation.

In an embodiment, the ACDM also has a vacuum gauge connected to the charge gun and a relief valve constructed and arranged to prevent damage to the vacuum gauge.

In an embodiment, the charge gun has a plurality of solenoid valves to open and close a plurality of ports on the charge gun.

In an embodiment, the user interface has an alarm system connected to the user interface.

In an embodiment, the user interface includes means for configuring the refrigerant metering charge board for a plurality of products.

In an embodiment, the user interface has means for displaying images which duplicate operation of the apparatus in approximately real-time.

In an embodiment, the user interface includes a color touch-screen monitor having a plurality of screen images selectable by a user.

In an embodiment, the plurality of screens selectable by the user include screens having vacuum levels, pressures and temperatures present in the apparatus.

In an embodiment, the user interface provides a programmable logic controller (PLC) connected to the ACDM, the refrigerant and oil dispensing system, the charge gun, and the means for positioning a refrigerating appliance.

In an embodiment, the refrigerant dispensing system further comprises: an external tank of refrigerant; at least one filter connected via a refrigerant supply line to the external tank of refrigerant; a temperature sensor to sense the temperature of the refrigerant in the refrigerant supply line; a pressure sensor/transducer to sense the pressure of the refrigerant in the supply line; hydraulic cylinder for metering the amount of refrigerant to be dispensed; and at least one servo motor to control the hydraulic cylinder.

In an embodiment, the pressure sensor/transducer is a real-time pressure transducer.

In an embodiment, the refrigerant dispensing system has means for calculating the amount of refrigerant to be dispensed on the basis of a modified Benedict-Webb-Ruben equation of state; and means for calibrating the amount of refrigerant.

The present invention provides, in another embodiment, a method for charging a refrigerating appliance with refrigerant. The method has the steps of: providing a metering charge board connected to a supply of refrigerant; aligning the refrigerating appliance with an automatic connect and disconnect mechanism (ACDM) having a dispensing device, the ACDM connected to the metering charge board; connecting the dispensing device to refrigerant tubing in the refrigerating appliance; and automatically charging the refrigerating appliance with a specific charge amount of refrigerant by the metering charge board via the dispensing device on the ACDM.

In an embodiment, the method also has the step of evacuating the refrigerant tubing in the refrigerating appliance before automatically charging the refrigerating appliance.

In an embodiment, the method includes the step of determining a model of the refrigerating appliance by reading a bar code on the refrigerating appliance.

In an embodiment, the method further provides the step of checking the pressure in the refrigerant tubing in the refrigerating appliance before automatically charging the refrigerating appliance.

In an embodiment, the method also includes the steps of charging various models of refrigerating appliances sequentially; and accessing a data base of specific charge amounts stored in the refrigerant metering charge board before automatically charging the refrigerating appliance to determine the specific charge amount for each appliance.

In an embodiment, the method also has the step of storing the specific charge amounts by model and serial number of the refrigerating appliances in a storage means located in the refrigerant metering charge board.

In an embodiment, the present invention provides a mounting enclosure having transparent doors to view the operation of the refrigerant supply system and a single oil supply system. In another embodiment, the invention has a two oil supply system.

In an embodiment, the user interface further has means for configuring the refrigerant metering charge board apparatus for various models of refrigerators. Also, an embodiment of the user interface further has means for displaying images which duplicates operation of the system in real-time.

In an embodiment, the user interface further has a modular card cage with a plurality of control cards. The user interface also has a programmable logic controller (PLC).

BRIEF DESCRIPTION OF THE DRAWINGS

FIG. 7 illustrates a top plan view of a process tube fixture for use with an automatic connect/disconnect mechanism (ACDM) of the present invention.

FIG. 8 illustrates a front elevation view of the process tube fixture of FIG. 7 of the present invention.

FIG. 9 illustrates a side elevation view of the process tube fixture of FIG. 7 of the present invention.

DETAILED DESCRIPTION OF THE PREFERRED EMBODIMENTS

Figure 1:
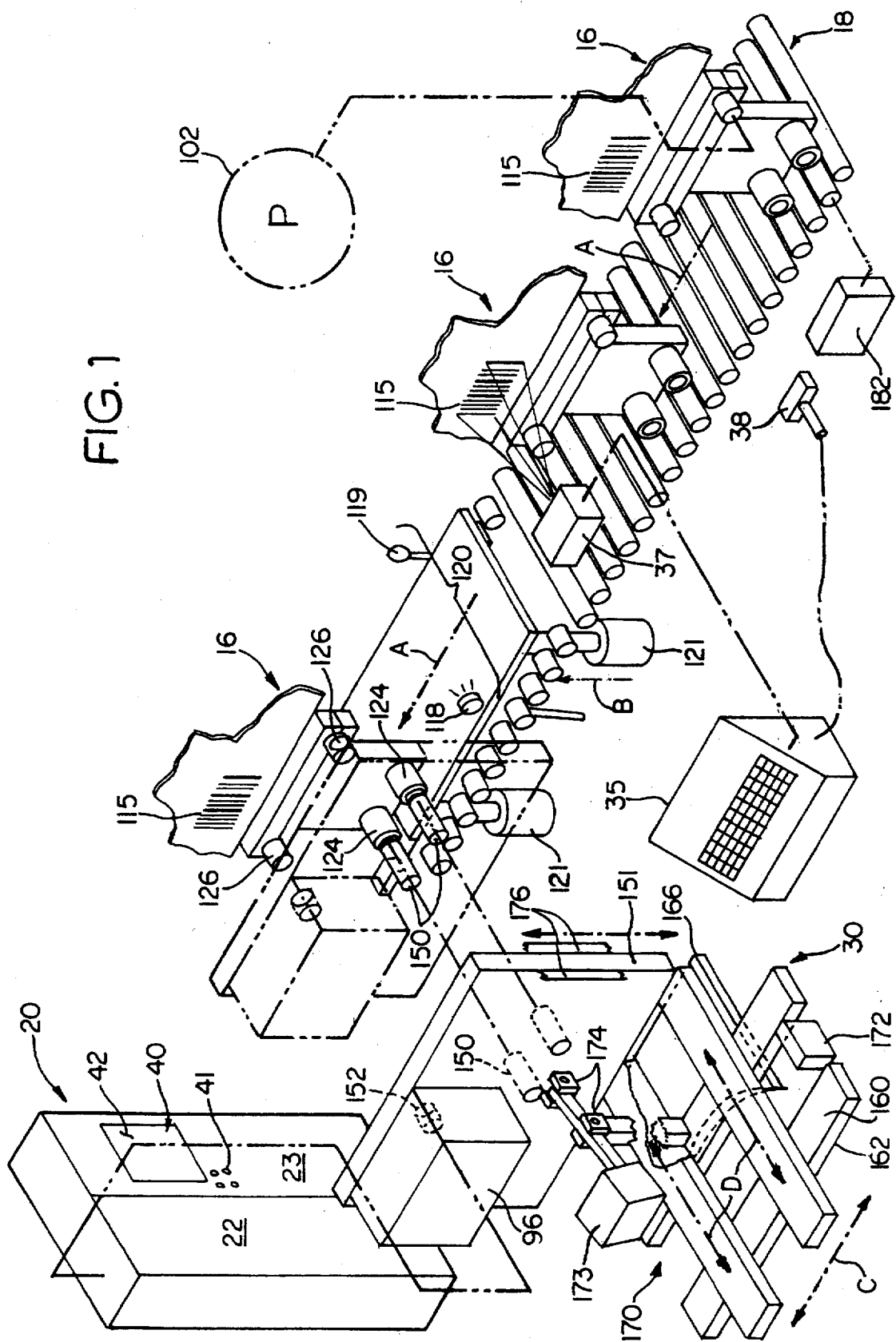
FIG. 1 illustrates a portion of a refrigerator on a conveyor system positioned for charging by an automated refrigerant metering charge board of the present invention.

An automated refrigerant metering charge board of the present invention accurately meters a refrigerant (preferably R134a) and an associated synthetic compressor oil into a product, preferably a refrigerator. The metering is accomplished by way of servo motors coupled to ball screws which are in turn connected to hydraulic cylinders. Calibration of the R134a is maintained using a temperature sensor, a programmable logic controller (PLC) and a density/temperature equation that has been empirically fit to saturation data. This equation is a modified Benedict-Webb-Ruben (MBWR) equation of state. The basic Benedict-Webb-Ruben equation of state has been described in a paper "Thermodynamic Properties of R134a (1,1,1,2-Tetrafluoroethane)" by Huber and McLinden, incorporated herein by reference. The refrigerant charge amounts are entered into the programmable logic controller using either a fixed bar code scanner or a hand-held bar code scanner that reads a bar code on the product, i.e., the refrigerator. An operator interface is a touch-screen display in a preferred embodiment. A known charging tool or charge gun which has a valve used to connect the product for inserting the refrigerant is also provided. The charge gun is located in an automatic connect/disconnect mechanism (ACDM) which allows for automated operation of the present invention in an assembly line manner of manufacture.

As stated in the paper, "Thermodynamic Properties of R134a (1,1,1,2-Tetrafluoroethane)" by Huber and McLinden, the modified Benedict-Webb-Rubin equation of state proposed by Jacobsen and Stewart is used to represent the thermodynamic surface. The equation is wide-ranging in temperature and pressure and is applicable in both the liquid and vapor regions, except near the critical point. It has been applied successfully to hydrocarbons, common inorganics and cryogenic fluids. It also has been used previously to represent R134a; the availability of new, more accurate data makes it desirable to refit the MBWR equation of state. The functional form for this equation is essentially a polynomial in density and temperature:

$$P = \sum_{n=1}^{9} a_n(T)p^n + e^{-(p/p_c)^2} \sum_{n=10}^{15} a_n(T)p^{2n-17}$$

Table 1 gives the temperature dependence of the MBWR coefficients.

TABLE 1

| | |
|---|---|
| $a_1 = RT$ | $a_9 = b_{19}/T^2$ |
| $a_2 = b_1T + b_2T^{0.5} + b_3 + b_4/T + b_5/T^2$ | $a_{10} = b_{20}/T^2 + b_{21}/T^3$ |
| $a_3 = b_6T + b_7 + b_8/T + b_9/T^2$ | $a_{11} = b_{22}/T^2 + b_{23}/T^4$ |
| $a_4 = b_{10}T + b_{11} + b_{12}/T$ | $a_{12} = b_{24}/T^2 + b_{25}/T^3$ |
| $a_5 = b_{13}$ | $a_{13} = b_{26}/T^2 + b_{27}/T^4$ |
| $a_6 = b_{14}/T + b_{15}/T^2$ | $a_{14} = b_{28}/T^2 + b_{29}/T^3$ |
| $a_7 = b_{16}/T$ | $a_{15} = b_{30}/T^2 + b_{31}/T^3 + b_{32}/T^4$ |
| $a_8 = b_{17}/T + b_{18}/T^2$ | |

Table 2 gives the coefficients for the MBWR equation state.

TABLE 2

| | | | | | |
|---|---|---|---|---|---|
| $b_1$ +9.652 093 6222 E − 02 | $b_2$ −4.018 247 6889 E + 00 | $b_3$ +3.952 395 3286 E + 01 |
| $b_4$ +1.345 328 6896 E + 03 | $b_5$ −1.394 397 4135 E + 06 | $b_6$ −3.092 813 5518 E − 03 |
| $b_7$ +2.923 815 1228 E + 00 | $b_8$ −1.651 466 1356 E + 03 | $b_9$ +1.507 060 0312 E + 06 |
| $b_{10}$ +5.349 739 4831 E − 05 | $b_{11}$ +5.439 333 1762 E − 01 | $b_{12}$ −2.113 260 4976 E + 02 |
| $b_{13}$ −2.681 912 0385 E − 02 | $b_{14}$ −5.410 671 2595 E − 01 | $b_{15}$ −8.517 317 7940 E + 02 |
| $b_{16}$ +2.051 882 5365 E − 01 | $b_{17}$ −7.330 501 8809 E − 03 | $b_{18}$ +3.806 559 6386 E + 00 |
| $b_{19}$ −1.058 320 8759 E − 01 | $b_{20}$ −6.792 430 8442 E + 05 | $b_{21}$ −1.269 983 7860 E + 08 |
| $b_{22}$ −4.262 344 3183 E + 04 | $b_{23}$ +1.019 733 3823 E + 09 | $b_{24}$ −1.866 995 2678 E + 02 |
| $b_{25}$ −9.334 263 2342 E + 04 | $b_{26}$ −5.717 352 0896 E + 00 | $b_{27}$ −1.767 627 3879 E + 05 |
| $b_{28}$ −3.972 827 5231 E − 02 | $b_{29}$ +1.430 168 4480 E + 01 | $b_{30}$ +8.030 852 9426 E − 05 |
| $b_{31}$ −1.719 590 7355 E − 01 | $b_{32}$ +2.262 383 8566 E + 00 | |

Referring now to specific embodiments as illustrated in the drawings, FIG. 1 shows a portion of a refrigerator 16 (see FIG. 6) positioned at various operative locations on a conveyor 18. A refrigerant metering charge board 20 is also shown connected to an automatic connect/disconnect mechanism (ACDM) 30 via associated plumbing and tubing. A bar code reader control panel 35 connected to a fixed bar code scanner 37 and/or a hand-held bar code scanner 38 is also provided.

Figure 2:
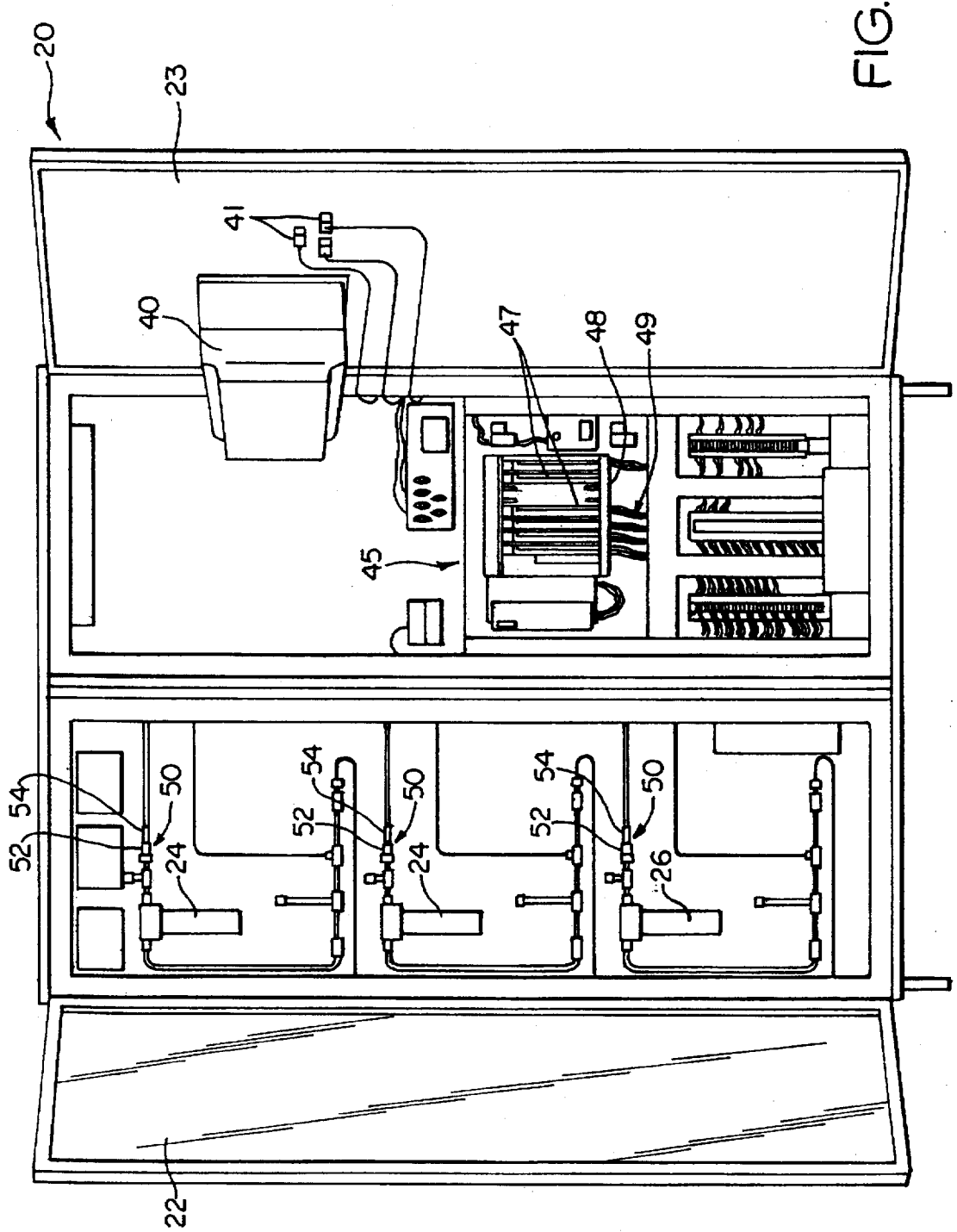
FIG. 2 illustrates a front elevation view of a refrigerant metering charge board of the present invention with enclosure doors open.
Figure 3:
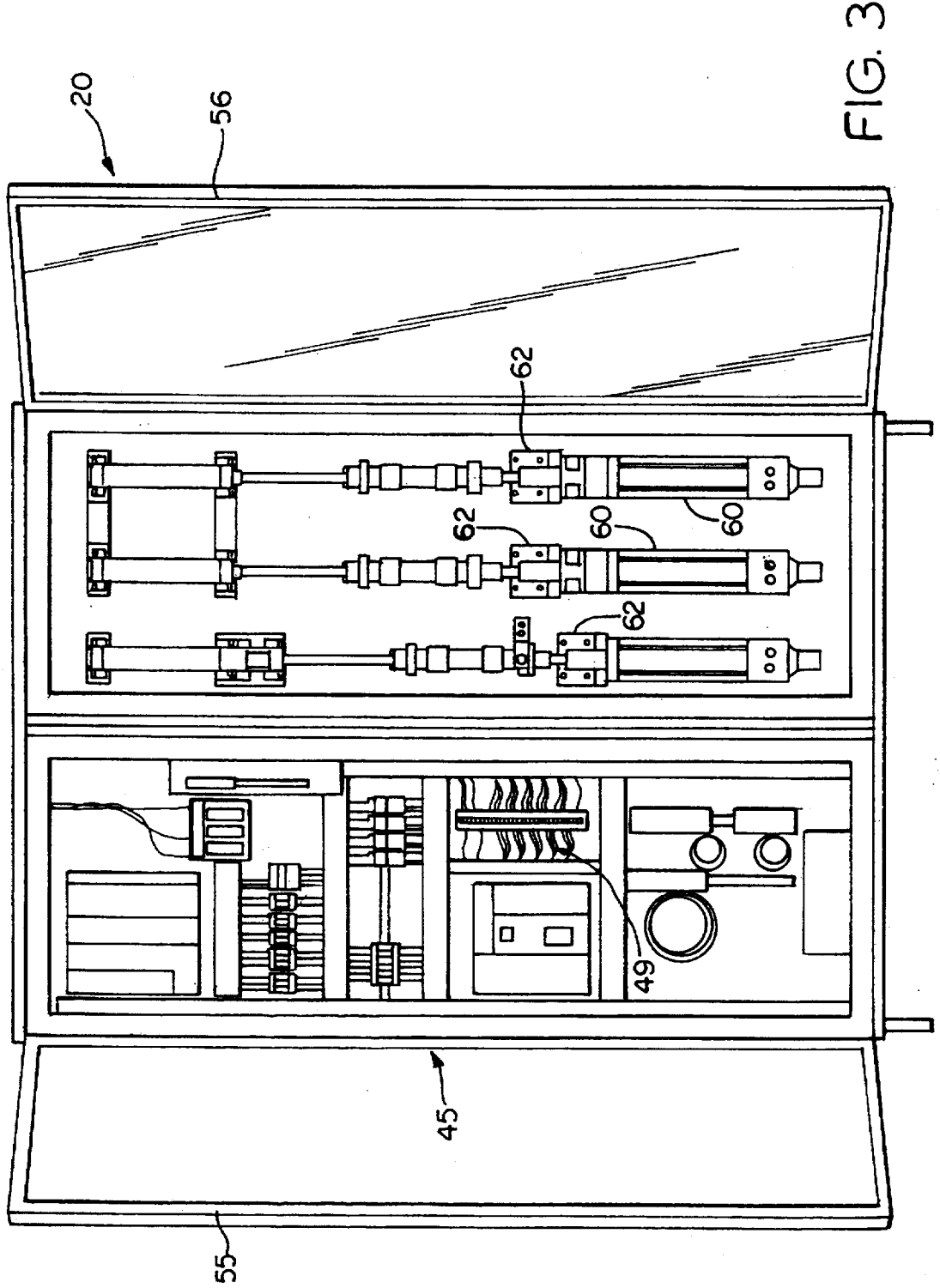
FIG. 3 illustrates a rear elevation view of a refrigerant metering charge board of an embodiment of the present invention with enclosure doors open.

In an embodiment of the present invention shown in FIG. 2, the charge board 20 comprises a modular enclosure having a front (see FIG. 2) and a back (see FIG. 3). Preferably, the charge board 20 has two front doors and two back doors. A left hand side door 22 and a right hand side door 23 are shown. The left hand side door 22 on the front of the charge board 20 is preferably transparent so that an operator can observe the operation of components within the charge board 20. Included within the left hand side of the front of the charge board 20 are filters 24 for an external oil supply (see FIG. 5) and a filter 26 for a refrigerant supply (see FIG. 5), along with associated plumbing therefor.

Referring back to FIG. 1, the right hand side of the front of the charge board 20 has a display monitor 40, as well as controls and displays 41. A display screen 42 of the monitor 40 can be seen in detail in FIG. 13. As shown in FIG. 2, the right hand side door 23 is open. A programmable logic controller (PLC) 45 is housed near the bottom of the right hand side of the charge board 20, along with associated I/O for the PLC 45. The PLC 45 has a plurality of logic cards 47 inserted in a card cage 48. The cards 47 use signals generated by transducers 50 and connected via cabling 49 to provide control of the charge board apparatus 20. Specific operations of the PLC 45 include processing input parameters such as refrigerant temperature and pressure obtained from the transducers and using these parameters in the modified Benedict-Webb-Ruben (MBWR) equation of state discussed below.

FIG. 3 illustrates a rear view of the charge board 20 with a rear left hand door 55 and a rear right hand door 56 open. The right hand door 56 is preferably transparent for observing the apparatus inside. The PLC 45 is also shown from the rear. As mentioned above, the logic cards 47 of the PLC 45 have associated cabling 49 connected thereto to provide input and output signals.

FIG. 3 also shows, on the right hand side of the rear of the charge board 20, a plurality of hydraulic cylinders 60 and servo motors 62 which use ball screws 64 and nuts 65 coupling the servo motors 62 to the hydraulic cylinders 60 for proper metering of refrigerant and synthetic compressor oil. The right hand side of the rear of the charge board 20 is illustrated in greater detail in FIG. 4.

Figure 4:
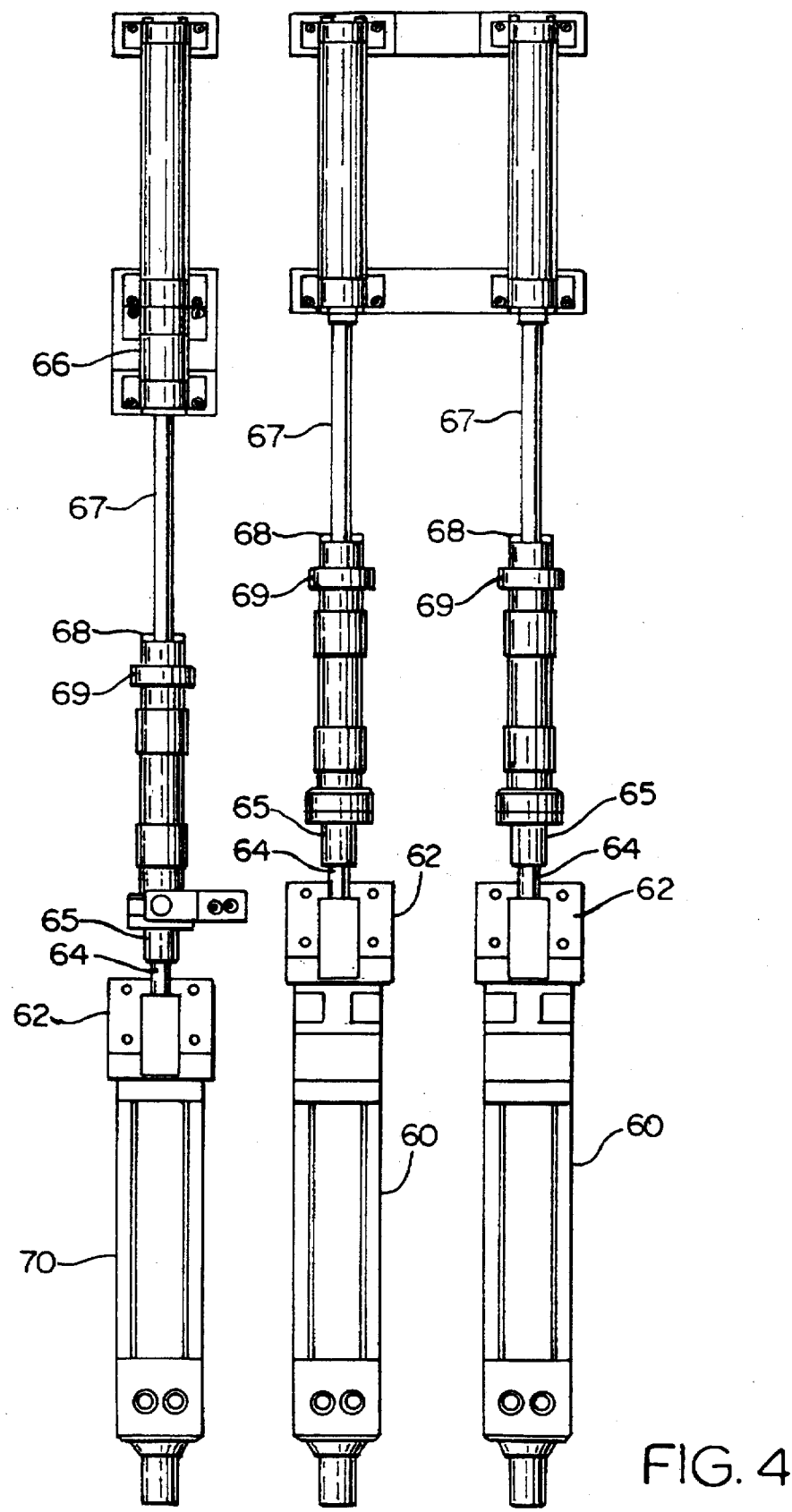
FIG. 4 illustrates a detail view of the right hand side of the embodiment of the present invention of FIG. 3.

Referring to FIG. 4, two of the hydraulic cylinders 60 shown control two different oil supplies. A further hydraulic cylinder 70 is shown which meters out the proper amount of R134a refrigerant. It also has an ester oil cylinder 66 connected to it. The three hydraulic cylinders 60, 70 use stainless steel shafts 67 upon a guide rail 68. The guide rail 68 also has linear bearings 69 for smoother operation. In addition, the ball screw 64 and ball screw nut 65 are connected to the servo motors 62. The ball screw 65 is driven by the servo motor 62 for each individual cylinder 60, 70. The servo motor 62 precisely rotates the ball screw 64 which uses the nut 65 to move the cylinder shaft 67 to dispense the proper amount of fluid.

In addition, the PLC 45 mentioned above calculates the amount of refrigerant necessary for properly charging the refrigerator 16 using the MBWR equation. The PLC 45 also controls the servos 62 connected to the hydraulic cylinders 60 which are used to meter out the proper amount of refrigerant. The proper amount of refrigerant is based upon the result of the MBWR equation and input parameters. The amount of refrigerant to be dispensed is determined in the PLC 45 as mentioned above by taking readings of the temperature and pressure of the refrigerant itself. The transducers 50 are located after the filters 24 on the front side of the charge board 20. Preferably, the transducers 50 include a pressure transducer 52, and a temperature transducer 54, which is preferably a resistive temperature detector (RTD).

The present invention then uses a planar regression equation and other data to determine how far to stroke the cylinder 70 with the servo motor/ball screw combination. The pitch of the lead screw and the bore of the cylinder 70 are also necessary to determine the amount of stroke. Basically the volume of refrigerant is equal to the product of the bore and the stroke of the cylinder. Also, the mass of the refrigerant is necessary, which is determined by its temperature, pressure and the planar regression of the MBWR equation.

The refrigerant is also calibrated, but the oil is not. The calibration factor for the refrigerant is also multiplied by the MBWR equation to determine the proper amount of refrigerant necessary.

In prior art devices, only temperature is used, not pressure, and a least squares regression by temperature is used to determine the amount of refrigerant needed. However, the modified Benedict-Webb-Ruben equation mentioned above is utilized in a narrower range, which provides better prediction of values.

An advantage over the prior art of the present servo motor system used to actuate the cylinders 60, 70 is that no other fluid is in contact with the fluid that is metered out, i.e. the refrigerant. Also, the servo motors 62 provide improved accuracy over the hydraulics of the prior art devices. In addition, the prior art hydraulics use valves to change the direction of flow and commonly the hydraulic fluid thereby contaminated the refrigerant, which would disable and/or decrease the effectiveness of the refrigeration unit in the product.

An additional advantage of the servo motor system of the present invention is that it provides improved accuracy of dispensation of fluids. For example, refrigerant may be metered with a ±1 gram error, whereas in prior metering devices a ±7 gram error was common.

In addition to the pressure transducer 52 discussed above, the transducers 50 used in the present invention are real-time pressure transducers instead of the known mercury switches with D'Arsonval movement. This also has the advantage of improved operation and accuracy.

Figure 5:
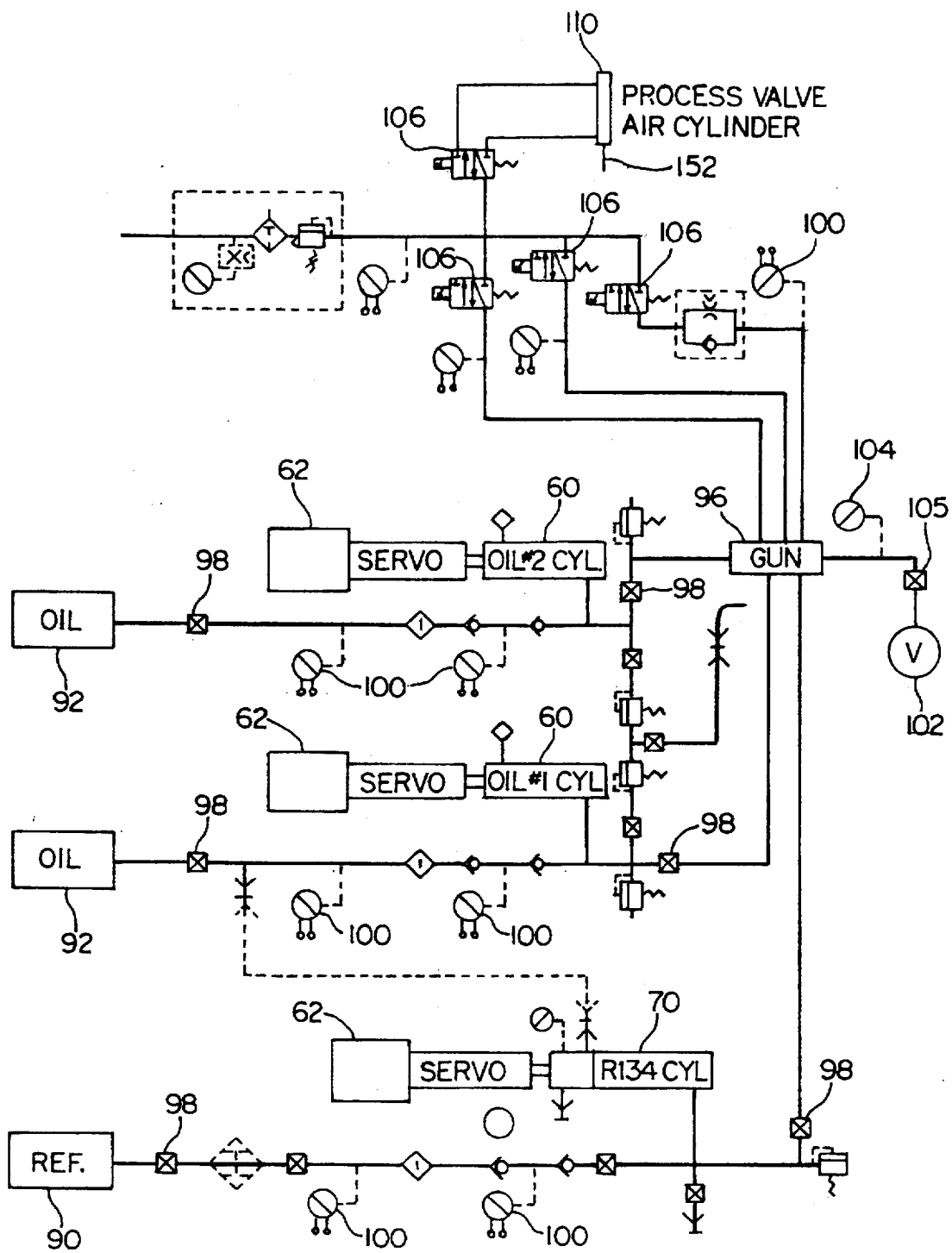
FIG. 5 illustrates a plumbing schematic of an embodiment of the present invention.

FIG. 5 illustrates a schematic diagram of the plumbing and refrigerant/oil flow of the present invention. As shown, an external supply of refrigerant 90 and oil 92 is provided to the charge board 20. The external supply of refrigerant 90 and oil 92 is connected via filters 26, 24 (see FIG. 2) which clean the refrigerant and oil so that no contamination occurs in the use of same. A general description of FIG. 5 follows.

As illustrated in FIG. 5, the external supply of refrigerant 90 and the external supplies of oil 92 are shown connected through the servo motor assemblies 62 to a metering charge gun 96. The refrigerant 90 and oil supplies 92 flow through numerous valves 98, and gauges/sensors/transducers 100. The outputs of the oil cylinders 60 and the refrigerant cylinder 70 pass through the valves 98 to the metering charge gun 96. A vacuum pump 102 is also connected to the metering charge gun 96. The charge gun 96 is typically driven by pressurized air. Thus, a vacuum/pressure gauge 104 is connected between the vacuum pump 102 and the metering charge gun 96.

FIG. 5 also illustrates a relief valve 105 for the vacuum gauge 104. This is preferably a 1 psi relief valve which alleviates pressure to avoid damage to the vacuum gauge 104 and to also avoid a spraying of fluid on the equipment in the event of a failure due to overpressure. The relief valve 105 is especially important since the vacuum gauge 104 is very expensive and fragile. The replacement of such a gauge is costly. In addition, cleaning the mess created by the destruction of the gauge 104 is time consuming and interferes with production.

A plurality of solenoids 106 are connected to the metering charge gun 96 prior to connection to a process valve air cylinder 110. The process valve air cylinder 110 provides the injection force for supplying the refrigerator 16 with a mixture of the refrigerant 90 and oil 92. As stated above, the general arrangement is shown in FIG. 1, and the method of charging the refrigerator using a refrigerant metering charge board 20 of the present invention is described with reference to FIG. 14 below.

Figure 6:
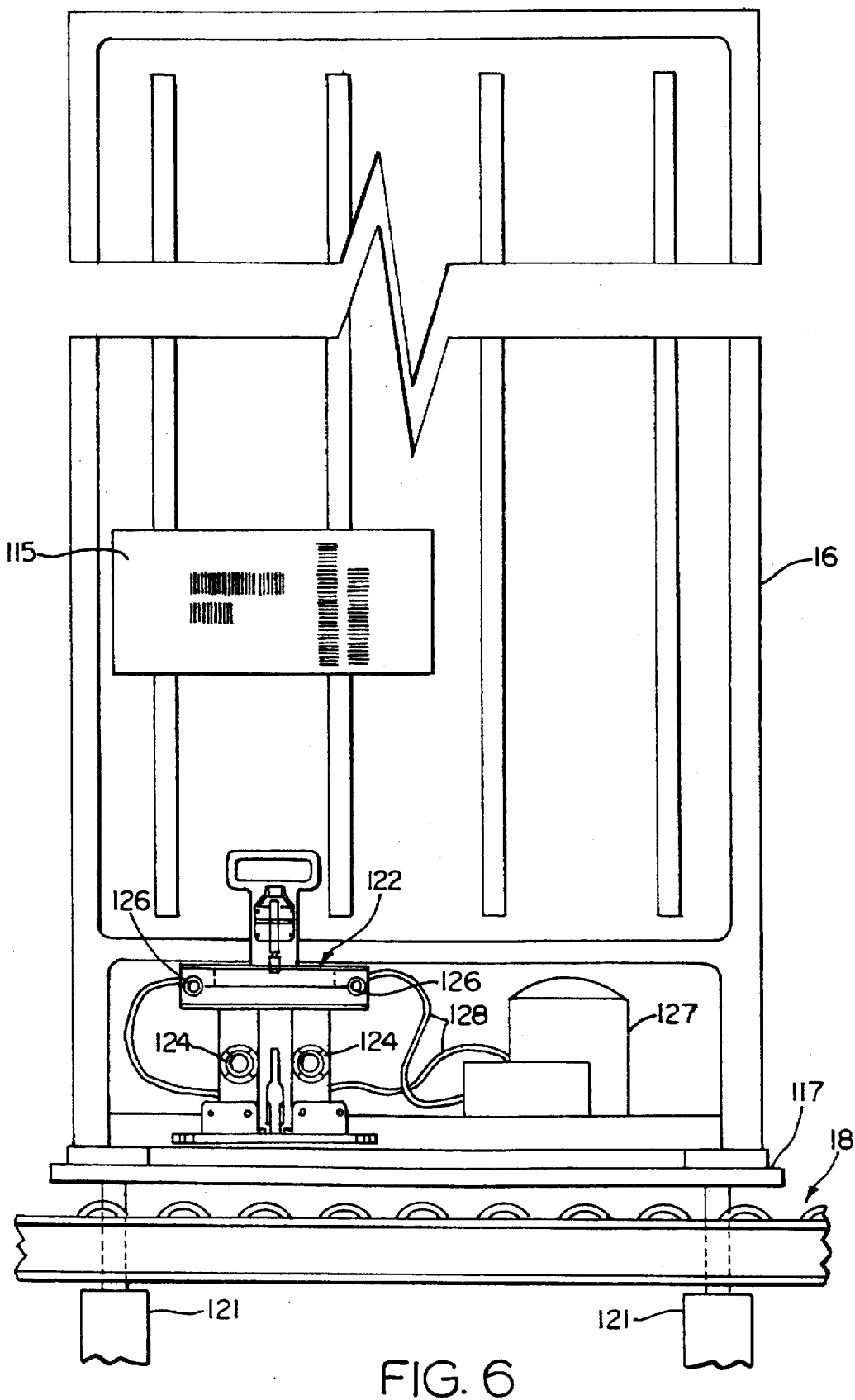
FIG. 6 illustrates a rear elevation view of the refrigerator to be charged by the apparatus of the present invention.

FIG. 6 illustrates the rear of the refrigerator 16 showing connections for using the ACDM 30 to meter in the proper amount of refrigerant 90 with the charge board 20 of the present invention. As generally illustrated in FIG. 1 and discussed above, the refrigerator 16 travels along in a direction indicated by arrow A along the conveyor 18. When the refrigerator 16 nears the ACDM 30 of the present invention, the fixed bar code scanner 37 reads a bar code label 115. The bar code label 115 is affixed to the refrigerator 16 and contains information regarding the model number and serial number of the refrigerator 16. In addition, a lifting plate 117 is affixed to the refrigerator 16 upstream in the assembly of the refrigerator 16. Further, a light source 118 and a reflector 119 form a position sensor 120 for detecting and stopping the refrigerator 16. The refrigerator 16 breaks the light beam created by the light source 118 and a signal is then sent to the PLC 45 to actuate lifters 121. The lifting plate 117 is mounted to the bottom of the refrigerator 16 so that the lifters 121 can raise the refrigerator 16 off the conveyor 18 prior to charging the refrigerator 16. As shown in FIG. 1, the lifters 121 raise the refrigerator 16 in the direction of arrow B.

In addition, a process tube fixture 122 is connected to the refrigerator 16 shown in FIG. 6 for subsequent mating to the ACDM 30 as shown in FIG. 1. The process tube fixture 122 is shown in detail in FIGS. 7-9 and described below. Further, the process tube fixture 122 is outfitted with a pair of alignment tubes 124. The alignment tubes 124 are preferably equipped with UHMW plastic bushings. Also, process valves 126 are provided. The process valves 126 are connected to a refrigerant tank 127 via pipes 128. The process valves 126 are provided for metering in the proper amount of refrigerant using the process valve air cylinder 110 shown in FIG. 5.

FIG. 7 illustrates a top plan view of the process tube fixture 122 of the present invention. The process tube fixture 122 has a bottom plate 130 and a locator 132 which facilitates connection and aligns the process tube fixture 122 to the framework of the refrigerator 16. The locator 132 thereby provides improved alignment for metering refrigerant into the refrigerator 16.

FIG. 8 illustrates a front view of the process tube fixture 122 in elevation. A vertical member 134 is shown connected to the base member 130. The alignment tubes 124 having UHWM plastic bushings are also illustrated. An upper clamp 136 is connected to an upper yoke 138. The upper yoke 138 cooperatively mates to a lower yoke 140. The upper yoke 138 and the lower yoke 140 each have a semi-circular cutout 142. The purpose of the semi-circular cutout 142 is to capture and hold the process valves 126 therein. Once the process valves 126 are captured in these semi-circular cutouts 142, the upper clamp 136 is secured to hold the process tube fixture 122 onto the valves 126. Also, a lower clamp 144 is provided to secure the process tube fixture 122 to the refrigerator 16. FIG. 9 further illustrates a side elevation view of the process tube fixture 122 and the alignment tubes 124 of the present invention.

Referring back to FIG. 1, a functional diagram of the ACDM 30 of the present invention is shown. In the embodiment shown, the fixed bar code scanner 37 is mounted near the ACDM 30. The fixed bar code scanner 37 is positioned to read the bar code label 115 that is present on the product, i.e., the refrigerator 16. The bar code label 115 contains the serial number and the model number of the refrigerator 16. The model number information is used by the PLC 45 in calculating the proper amount of refrigerant for the model of refrigerator 16.

In an alternate embodiment, the hand-held bar code scanner 38 could be used by the operator to scan the bar code label 115 on the refrigerator 16. The operation would be similar in that the hand-held bar code scanner 38 would read the model number and serial number from the refrigerator 16 and provide the same to the PLC 45 for processing.

Also, the ACDM 30 has the metering charge gun 96 with associated tubing and air compressor hoses connected thereto for operating the gun 96. The charge gun 96 is controlled by an air pressure system (not shown) and a system of solenoid valves 106 which open and close different ports on the gun 96 (see FIG. 5). An advantage of the charge gun 96 is that it is not necessary for the operator to be present to operate the gun 96. It can run automatically in conjunction with ACDM 30 of the present invention. The ACDM 30 also has a pair of alignment bullets 150 mounted to a vertical plate 151 that mate to the UHMW plastic alignment tubes 124 on the process tube fixture 122 mounted on the back of the refrigerator 16. The UHMW alignment tubes 124 are provided for proper locating of the refrigerator 16 for subsequent metering in of the proper amount of refrigerant 90 into the refrigerator 16 on the conveyor 18. There is also a charge nozzle 152 on the charge gun 96 which is driven by the process valve air cylinder 110 (see FIG. 5). The process valve 126 on the refrigerator 16 mates to the charge nozzle 152 on the gun 96 for proper metering of the refrigerant 90.

The ACDM 30 enables the locating of the charge nozzle 152 relative to the process valve 126 thereby allowing them to connect. Thus, the ACDM 30 allows the charge nozzle 152 to find the process valve 126 on the refrigerator 16. The process valve 126 attached to the process tube fixture 122 must be repeatedly located in order to automate the connection. The process tube fixture 122 facilitates this connection. For example, the process valves 126 are captured between the upper and lower yokes 138, 140 and are held firmly in place by the upper clamp 136 (see FIGS. 7–9). The flange mounted UHMW plastic alignment tubes 124 serve to locate the alignment bullets 150 mounted in the vertical plate 151 of the ACDM 30. An additional advantage of the ACDM 30 is that it moves side-to-side and up and down to provide more degrees of freedom for mating to the refrigerator 16 located on the conveyor 18.

The compliance necessary for connecting the process valve 126 is provided by the ACDM 30. The ACDM 30 allows horizontal side-to-side motion as indicated by arrow C by virtue of a linear bearing 160 and guide rail 162 mounted on a lower plate 166 of a carriage assembly 170. During the connection procedure, the carriage 170 is driven forward by an air cylinder 172. As the carriage 170 moves forward, the alignment bullets 150 of the ACDM 30 and the alignment tubes 124 of the process tube fixture 122 move the carriage 170 horizontally and vertically until they find each other's centerline. The linear bearing 160 and guide rail 162 mounted on the carriage assembly 170 assures true horizontal movement and absorbs the thrust connection.

The vertical motion is allowed by the vertical plate 151 which has a counterbalance weight 173 connected via a pair of pivot pins 174. Each vertical side of the vertical plate 151 is captured by UHWM plastic strips 176. The strips 176 reduce angular misalignment and also help absorb the initial thrust of the connection. The vertical plate 151 has a proximity sensor 180 (see FIGS. 10–12) mounted in it that senses whether the charge nozzle 152 is open or closed. This sensor 180 is in turn connected to a conveyor PLC 182.

Figure 10:
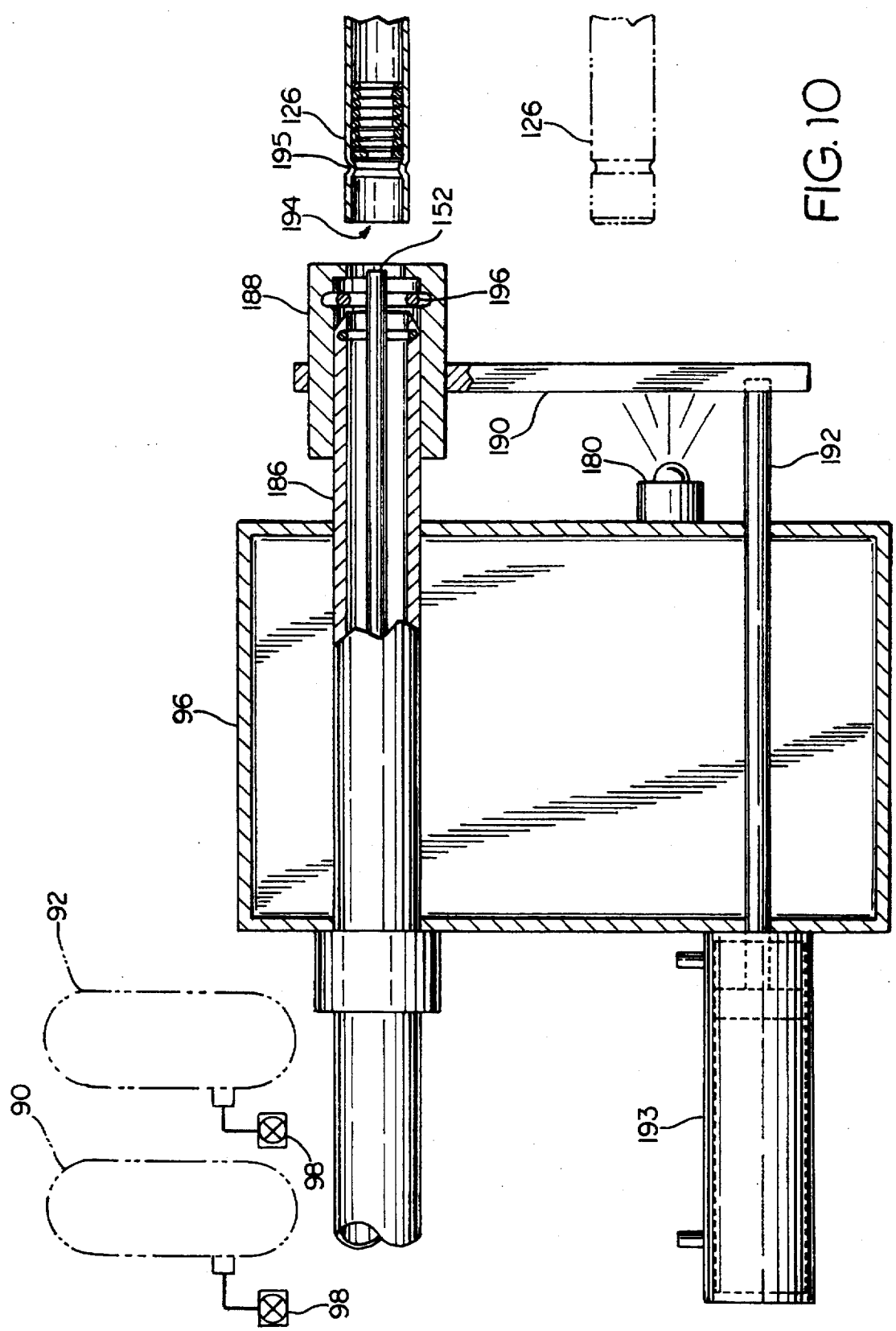
FIG. 10 illustrates a detail view of a portion of the ACDM of the present invention.
Figure 11:
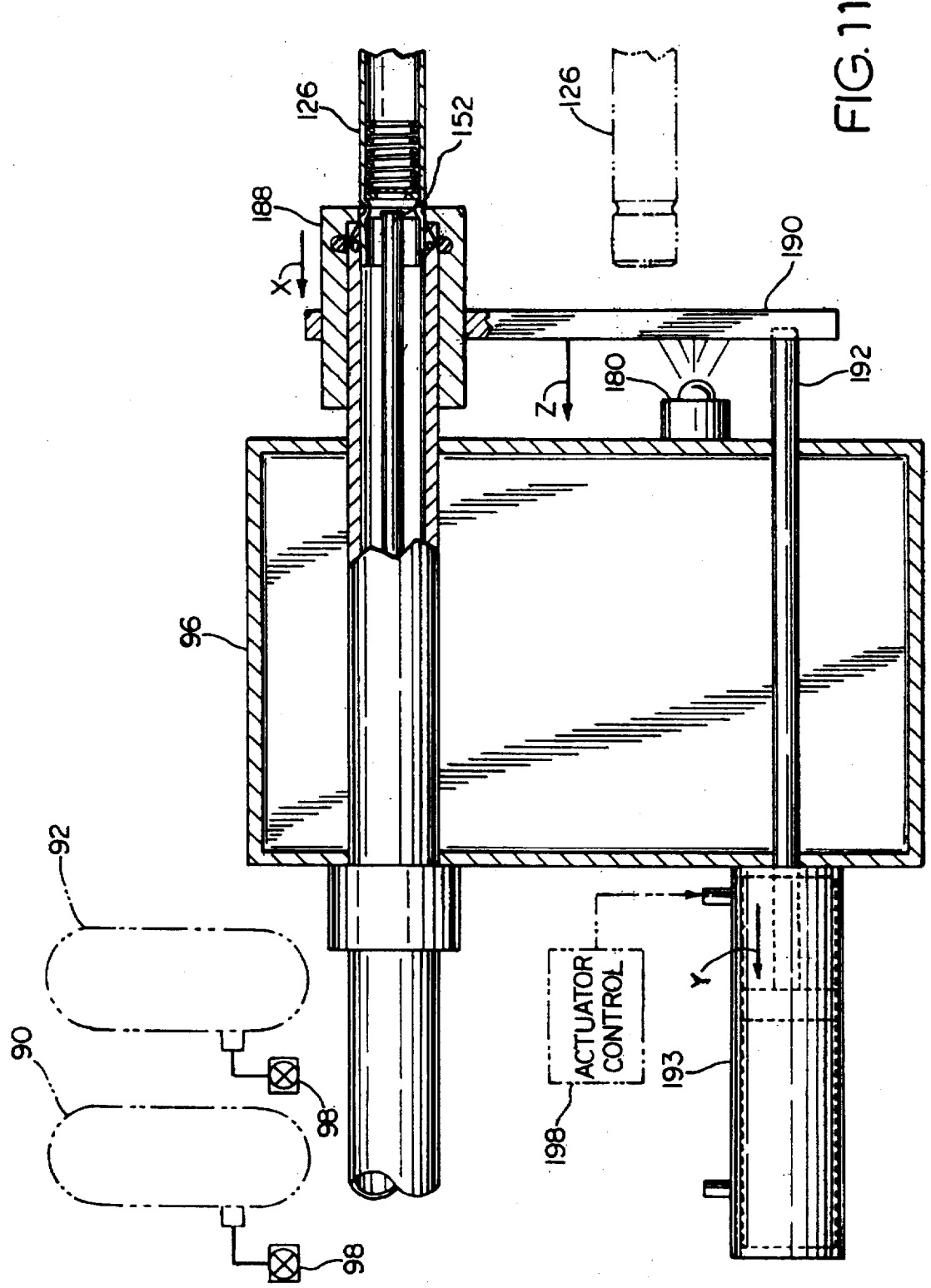
FIG. 11 illustrates a detail view of a portion of the ACDM of the present invention.
Figure 12:
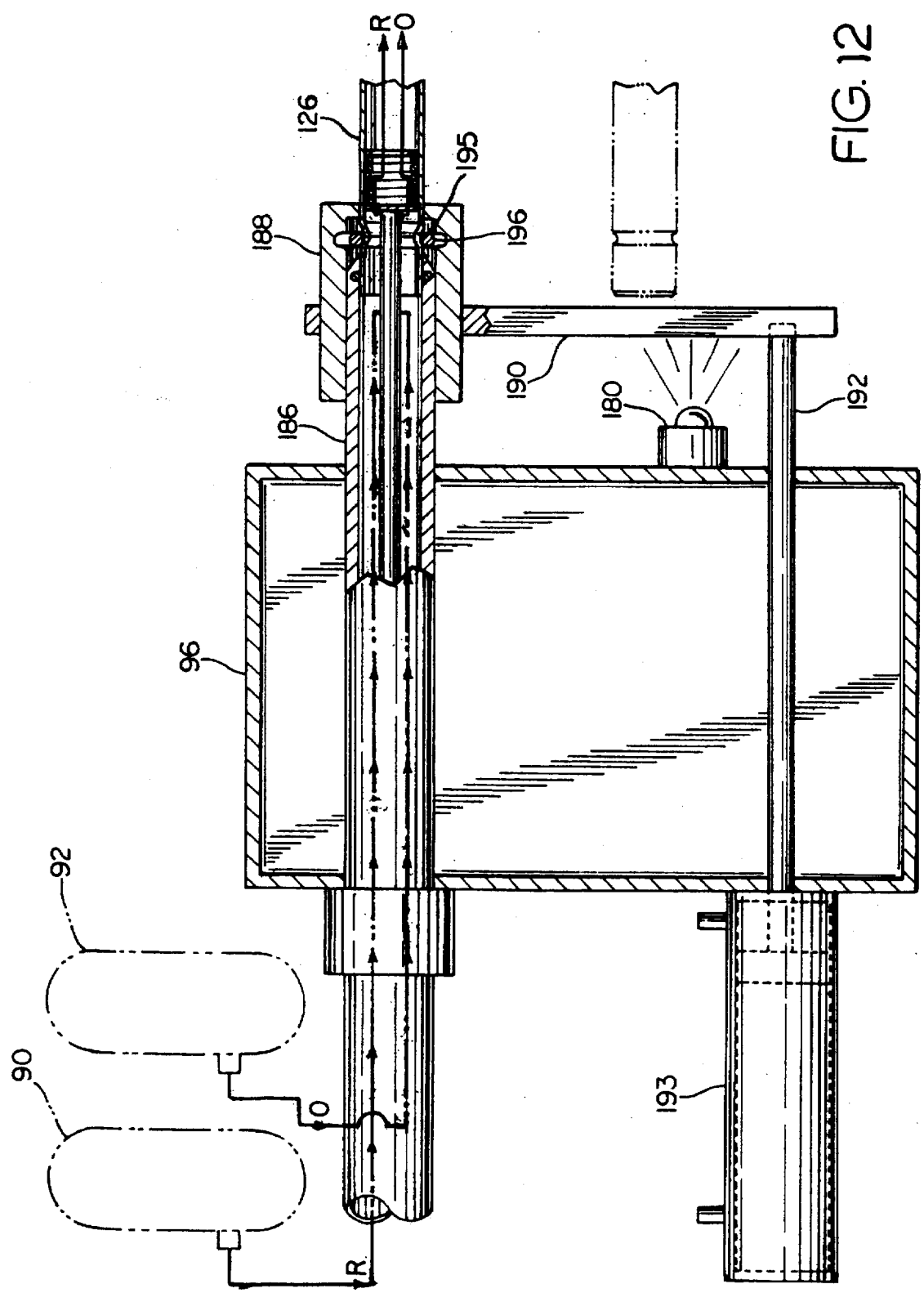
FIG. 12 illustrates a detail view of a portion of the ACDM of the present invention.

FIGS. 10–12 illustrate detailed views of the portion of the ACDM 30 of the present invention. For example, the charge gun 96 is illustrated. Also illustrated are the oil supply 92 and refrigerant supply 90 connected via valves 98 (see FIG. 5). Also, illustrated is the charge nozzle 152. The charge nozzle 152 is located within a tube 186. The tube 186 has a sleeve 188 located at one end. An actuator bar 190 is connected at one end to the sleeve 188. The actuator bar 190 is also connected at another end to an actuator rod 192, which is in turn connected to an actuator 193. Also, illustrated in FIG. 10 are the process valves 126. One process valve 126 is shown in cross section in FIG. 10 and includes an inlet 194 and a circumferential detent 195. Inside the sleeve 188 is an adjustable ring 196.

The charging operation of the refrigerant metering charge board 20 of the present invention will be described with reference to FIGS. 10–12. In FIG. 10, the ACDM 30 has been approximately located via the alignment bullets 150 to the process tube fixture 122 mounted to the refrigerator 16 (see FIG. 1). Thus, FIG. 10 shows the charge gun 96 in close proximity to the process valves 126. Specifically, the charge nozzle 152 is near the inlet 194 of the process valve 126.

Eventually, the process valve 126 enters the sleeve 188 as shown in FIG. 11. In order for the charge nozzle 152 to be able to dispense refrigerant and oil that is stored in the refrigerant supply 90 and the oil supply 92, the sleeve 188 must be drawn back as indicated by arrow X. This movement in the X direction is accomplished by the actuator 193 pulling in a direction indicated by arrow Y so that the actuator rod 192 also travels in the direction of arrow Y, thereby pulling the actuator bar 190 in the direction of arrow Z. This movement is initiated by an actuator control 198 connected to the actuator 193. The proximity sensor 180 detects the closeness of the actuator bar 190. When the actuator bar 190 is a predetermined distance from the proximity sensor 180, the charge nozzle 152 will be properly inserted into the process valve 126 so that the refrigerant and oil mixture can be inserted into the refrigerator 16 as illustrated in FIG. 12. When the sleeve 188 encloses the process valve 126 to the proper distance, the adjustable ring 196 seats itself in the circumferential detent 195 and holds the process valve 126 in place for proper metering of refrigerant 90 and oil 92. The refrigerant 90 and the oil 92 have flow paths indicated by arrows R and O. Once the proper amount of refrigerant 90 and oil 92 is inserted in the refrigerator 16, the actuator control 198 reverses the direction of the actuator rod 192 so that the sleeve 188 releases from the process valve 126 to complete a charging cycle.

Figure 13:
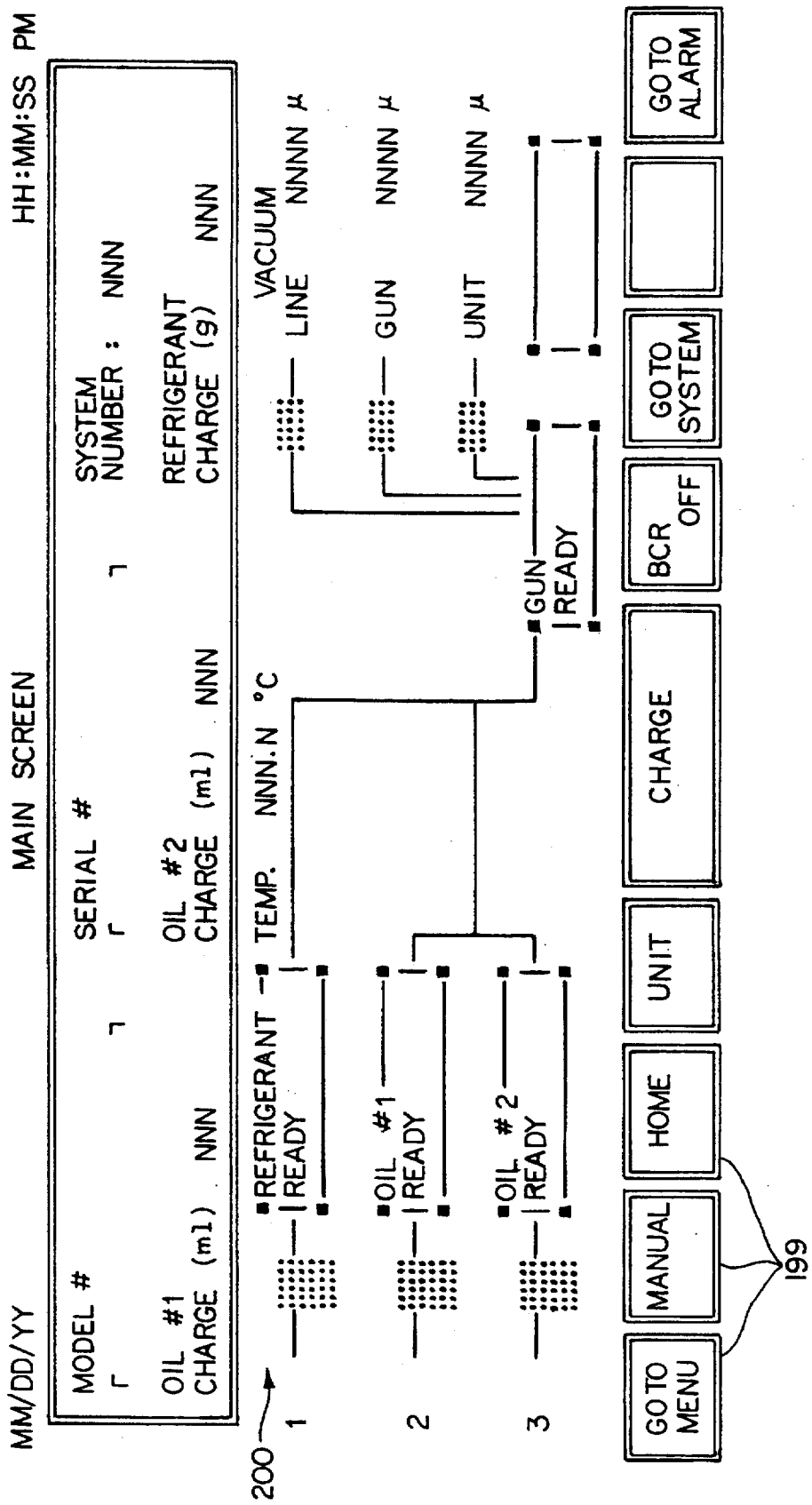
FIG. 13 illustrates an embodiment of a display screen of a touch-screen monitor of the present invention.

FIG. 13 illustrates an embodiment of the display screen 42 that is displayed on the touch-screen monitor 40 of the present invention. As shown in FIG. 1, the monitor 40 is preferably located on the right hand side of the front of the charge board cabinet 20. As illustrated in FIG. 13, valve openings and closings during operation of the present invention as well as values for pressures, temperatures, etc. are provided on the monitor 40 so that the user can observe how the charging operation is proceeding. The touch-screen monitor 40 can also be used to manually input parameters and to modify various parameters used in the process of metering the refrigerant. In addition, a plurality of touch keys 199 are provided for accessing different screens and parameters.

The touch-screen monitor 40 provides several display screens 42 including a main menu screen 200 (shown in FIG. 13) for the user to operate the present invention. The monitor 40 also provides various status indicators including the status of the servo motors 62, the charge gun 96, vacuum readings, alarms and whether the bar code scanner 37 is on or off. When the operation is in a manual mode, the charge values may be input by the operator using the touch-screen monitor 40. When the operation is automatic, the bar code scanner 37 reads the model number from the bar code label 115 which provides the PLC 45 with the model number so that the proper charge amounts for the particular product are selected.

In addition, the user interface of the touch-screen monitor 40 provides for initial set-up and password protection so that the charge board 20 can be operated only by a skilled and authorized user. Also, set-up charge amounts can be input and changed or modified as desired. This modification is done in a system edit mode of the touch-screen monitor 40.

Figure 14A:
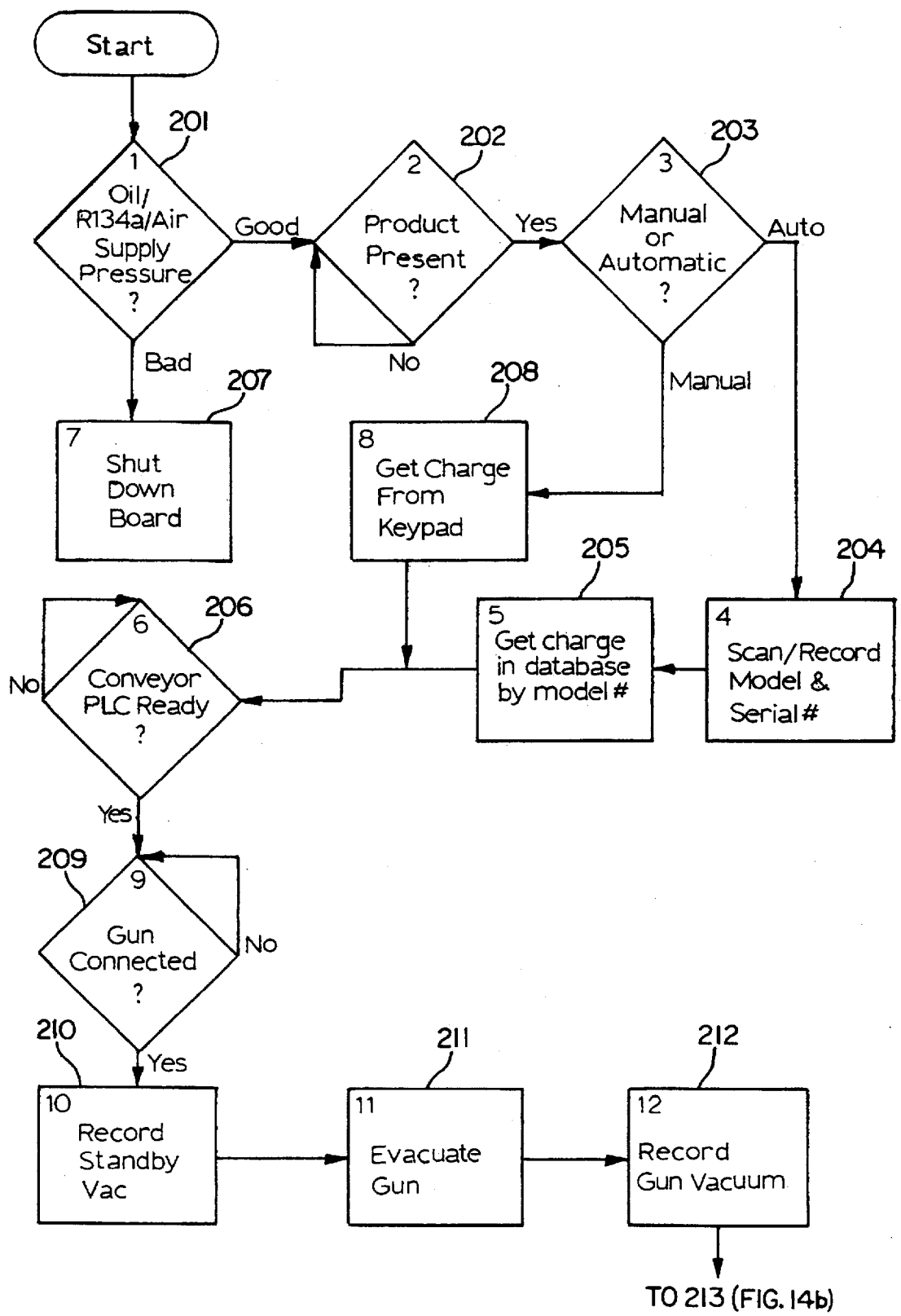
FIGS. 14a and 14b illustrate a block diagram flowchart of the operation of an embodiment of the present invention.
Figure 14B:
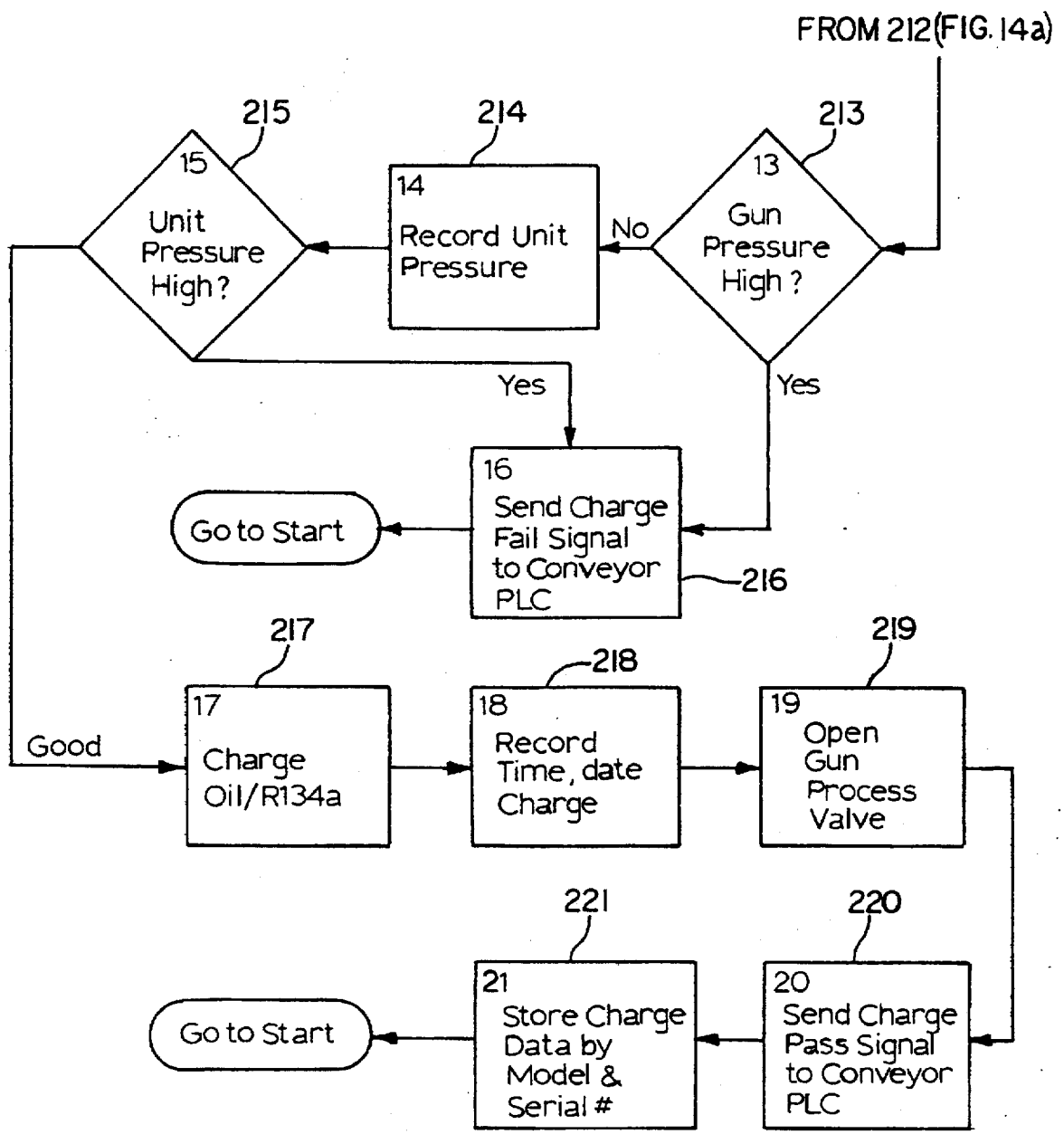

FIGS. 14a and 14b illustrate a flowchart of a typical operation of the present invention. A description of the flowchart follows. To begin with, in step 201 the oil, refrigerant R134a and air supply pressures are all checked to determine if they are good or bad. If the pressures are bad, the board is shut down as shown in step 207. If the pressures are good, the operation proceeds to detect whether a product is present as shown in step 202. The product is preferably the refrigerator 16 to be charged. If the refrigerator 16 is not present, the step is repeated; however, if the refrigerator 16 is present, the operation then determines whether manual or automatic operation is to be employed as shown in step 203. If manual operation is desired, the operation proceeds to step 208 in which the proper charge for the product is determined from the user by entering the charge amount from the panel view or touch screen display monitor 40 on the charge board 20. If the automatic mode is desired, the operation continues on to step 204 in which the product model and serial number are scanned and recorded by the bar code scanner 37 mounted near the ACDM 30. Next, the charge is recalled from a database as a function of the model number. (The model number was determined from the bar code scanner 37 in step 205.) The next step 206 determines whether the conveyor PLC 182 is ready or not. If not, step 206 is repeated; however, if the PLC conveyor 182 is ready, the operation proceeds to determine whether the gun 96 is connected as referenced in step 209. If not, this step is also repeated. However, if the gun 96 is connected, the operation records the stand-by vacuum level as referenced in step 210. The next step involves evacuating the metering charge gun 96 as referenced in step 211. Continuing on to step 212, the gun vacuum level is recorded and in step 213 the gun pressure is determined. If the gun pressure is high, a charge fail signal is sent to the conveyor PLC 182 and the operation returns to the start position. However, if the gun pressure is not high, the unit pressure is recorded as referenced in step 214. If the unit pressure is high as referenced in step 215, a charge fail signal is also sent to the conveyor PLC 182 as referenced in step 216, and the operation returns to the start position. Conversely, if the unit pressure is good, the product is charged with the oil and refrigerant R134a as referenced in step 217. The next step 218 is to record the time and date of the charge. In step 219 the operation then continues by opening the gun process valve 126. In step 220 a charge pass signal is sent to the conveyor PLC 182. Finally in step 221, the charge status is stored by model and serial number, and the operation is repeated by going back to the start.

Thus, the present invention provides a refrigerant metering charge board 20 that has much better pressure control of the refrigerant and oil that is inserted into a refrigerator, thus providing higher quality products. For example, the capability index of the process of making a new part to the print drawing requirements, termed CPK, is greater than 2.0 for the present invention. This is an improvement over a CPK of 1.0 for the prior art.

In addition, the present invention provides a charge board for metering a refrigerant that both reduces labor and injuries to operators of same. The old devices manually connected the charge gun which caused numerous injuries. However, the present invention provides an automatic gun that greatly reduces the potential risk of injury to an operator.

Further, the refrigerant metering charge board of the present invention provides that the optimum amount of refrigerant can be inserted into the refrigerator. For example, a minimum amount of energy is used by the refrigerator when the proper charge is provided. Variation from this proper charge can increase the energy required to cool the contents in the refrigerator. Thus, having tight, accurate control over the amount of refrigerant that is metered into the refrigerator enables the refrigerator to properly cool with minimum energy usage.

Another advantage of the present invention over the old charging systems is that the old charge boards may charge nothing or may over-charge a refrigerating appliance, whereas the present invention provides the servo system with feedback to detect any faults and will shut down the charge board upon sensing a fault, thereby preventing over and under-charging.

As is apparent from the foregoing specification, the present invention is susceptible of being embodied with various alterations and modifications which may differ particularly from those that have been described in the preceding specification.

It should be understood that I wish to embody within the scope of the patent warranted hereon, all such modifications as reasonably and properly come within the scope of my contribution to the art.

The embodiments of the invention in which an exclusive property or privilege is claimed are therefore defined as follows:

1. A system for determining a proper charge of refrigerant to charge a refrigerating appliance, the system comprising:

a temperature sensor connected to a supply of refrigerant and oil, said sensor providing an output temperature signal;

a pressure sensor connected to said supply of refrigerant and oil, said sensor providing an output pressure signal; and a means for processing said temperature signal and said pressure signal to calculate a volume, of refrigerant and oil charge to charge said refrigerating appliance, dependent on said temperature signal and said pressure signal.

2. The system of claim 1, wherein said means for processing further comprises:

a programmable logic controller (PLC) connected to the temperature sensor and the pressure sensor, the PLC being capable of calculating an output charge volume of refrigerant based on the input parameters of said temperature signal and said pressure signal, said PLC being programmed to calculate said output charge volume based on a modified Benedict-Webb-Rubin equation of state.

3. The system of claim 1, further comprising:

recognition means for identifying the refrigerating appliance connected to said processing means for determining the proper mass charge of refrigerant for the recognized refrigerating appliance.

4. The system of claim 3, wherein the recognition mean for identifying the refrigerating appliance is a bar code scanner.

5. A method of determining a proper charge amount of refrigerant to charge a refrigerating appliance from a refrigerant supply, the method comprising the steps of:

measuring a temperature of the refrigerant supply and providing a temperature signal;

measuring a pressure of the refrigerant supply and providing a pressure signal; and processing the temperature signal and the pressure signal to calculate a proper charge volume of refrigerant to charge the refrigerating appliance.

6. The method of claim 5, further comprising the step of:

calculating a proper volume of refrigerant by using said temperature signal and said pressure signal as input parameters in a equation based on a modified BWR equation of state.

7. The method of claim 5, further comprising the steps of:

recognizing the refrigerating appliance to be charged; and retrieving the proper mass charge of refrigerant for the recognized refrigerating appliance for use in calculating the proper charge volume.

* * * * *